(12) United States Patent
Chun et al.

(10) Patent No.: US 8,458,113 B2
(45) Date of Patent: Jun. 4, 2013

(54) DECISION SUPPORT SYSTEM OPTIMIZER FOR A REAL-TIME COMMAND CENTER

(75) Inventors: So Yeon Chun, Atlanta, GA (US); Laura Wynter, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 13/022,369

(22) Filed: Feb. 7, 2011

(65) Prior Publication Data
US 2012/0203724 A1 Aug. 9, 2012

(51) Int. Cl.
*G06N 5/00* (2006.01)
(52) U.S. Cl.
USPC ................................ 706/46; 706/45
(58) Field of Classification Search
USPC ...................................... 706/46, 45
See application file for complete search history.

(56) References Cited

U.S. PATENT DOCUMENTS
5,668,717 A 9/1997 Spall

OTHER PUBLICATIONS

Cheng, Rainbow: Cost-Effective Software Architecture-Based Self-Adaptation, Doctoral Thesis, CMU-ISR-08-113, Carnegie Mellon University, 2008, pp. 1-220.*

Qin, et al., A Bayesian Classifier for Uncertain Data, Proceedings of the 2010 ACM Symposium on Applied Computing, Mar. 2010, pp. 1010-1014.*

IBM, WebSphere ILOG Rules for .NET V7.0.2, WebSphere ILOG Rule Team Server online help, Rule Team Server basics, What is a Decision Tree, http://publib.boulder.ibm.com/infocenter/brdotnet/v7r0m2/index.jsp?topic=/com.ibm.websphere.ilog.brdotnet.doc/Content/Business_Rules/Documentation/_pubskel/Rules_for_DotNET/ps_RFDN_Global608.html.

Osorio et al., A Simulation-Based Optimization Framework for Urban Traffic Control, Report TRANSP-OR 101203 Transport and Mobility Laboratory, School of Architecture, Civil and Environmental Engineering, Ecole Polytechnique F 'ed'erale de Lausanne, transp-or.epfl.ch, Dec. 3, 2010, pp. 1-29.

* cited by examiner

*Primary Examiner* — Wilbert L Starks
(74) *Attorney, Agent, or Firm* — Scully, Scott, Murphy & Presser, P.C.; Daniel P. Morris, Esq.

(57) ABSTRACT

A decision support for real time command center, in one aspect, classifies, using a decision tree, an observed network state of a network into at least one category. A meta-model associated with the classified at least one category may be selected from a plurality of meta-models, the plurality of meta-models having been calibrated using results of simulations of a plurality of scenarios occurring in the network. One or more action plans may be evaluated by running the selected meta-model with data of the observed network state. One or more recommended action plans may be generated for the real time command center, based on the evaluation. Actual network state data resulting from having applied the one or more recommended action plans may be evaluated and used to recalibrate the meta-model and/or the decision tree.

22 Claims, 5 Drawing Sheets

US 8,458,113 B2

DECISION SUPPORT SYSTEM OPTIMIZER FOR A REAL-TIME COMMAND CENTER

FIELD

The present application relates generally to decision support systems for network infrastructures, and more particularly to a real-time command center decision support system optimizer.

BACKGROUND

A real-time command center is a facility that monitors, operates, and addresses problems as they occur on networks. The class of such networks includes transportation networks, rail networks, city and regional operations networks, data networks, and even non-physical networks such as supply chain networks. These centers are concerned with managing the complex systems which exist in such networks: typically there are multiple sets of physical and institutional constraints on their operation. The constraints on the operations are often too difficult to be managed manually in an effective and efficient manner. In many cases, some constraints of the system may be well understood by command center personnel, but the challenge arises because different parts of the system have overlapping and in some cases contradictory constraints.

An example is in a city operations center, where constraints may be present on the deployment of water pipe repair crews operating at certain times of the day, and the potential conflicts that can arise even when those constraints are satisfied if traffic congestion is expected on those parts of the road network due, for example, to a special event in the city or even to planned road closures. In short, it is unsatisfactory to rely on experts to make the most effective decisions across the full gamut of operational characteristics involved in managing real-time command centers because it is simply beyond human ability to effectively process the full range of overlapping interactions. The inventors of the present disclosure have recognized that in such cases, tools are needed to characterize the operations and handle the multiple, overlapping constraints and provide effective optimized suggestions to the command center personnel.

In addition to understanding the overlapping and sometimes contradictory physical and institutional constraints, the inventors in the present disclosure have also recognized that another aspect that is missing in real-time command centers today is the ability to assess the likely outcome of taking actions on the complex network which is being managed. Usually, assessing the likely outcome of one or more potential actions requires some type of tool, such as a simulation software program. However, one main impediment to using such simulation programs to assess the likely outcomes of several complex actions is that the time taken to run such software is prohibitively long. Indeed, it is often the case that the software would require tens of minutes, or perhaps much longer, to complete, after which time the event would have evolved considerably without having been addressed effectively. A second main impediment is that in general simulation software programs do not accurately reflect real-life conditions but rather represent an idealized state of the system. To provide concrete assessments of actions to be taken in a real-life event, the simulation program would have to correspond very closely to the real-time state of the system.

BRIEF SUMMARY

Methods and system for providing decision support for real time command center may be provided are disclosed. The method, in one aspect, may include classifying, using a decision tree, observed network state of a network into at least one category. The method may also include selecting from a plurality of meta-models, a meta-model associated with the classified at least one category, the plurality of meta-models having been calibrated using results of simulations of a plurality of scenarios occurring in the network. The method may also include evaluating one or more action plans by running the selected meta-model with data of the observed network state. The method may further include generating one or more recommended action plans for the real time command center, based on the evaluation step.

A method of providing decision support for real time command center, in another aspect, may include classifying, using a decision tree, a plurality of network states into a plurality of categories. The method may also include simulating a network using network state data associated with each of the classified categories and calibrating a meta-model for each of the classified categories using results of the simulating. The method may also include recalibrating the meta-model using data observed from an actual network that applied one or more action plans recommended as a result of evaluating said one or more action plans from running the meta-model.

A decision support system for real time command center, in one aspect, may include an event-type selection module operable to execute on the processor and further operable to classify an observed state of a network of a network into at least one category using a decision tree. A scenario evaluation module may be operable to select from a plurality of meta-models, a meta-model associated with the classified at least one category, the plurality of meta-models having been calibrated using results of simulations of a plurality of scenarios occurring in the network. The scenario evaluation module may be further operable to evaluate one or more action plans by running the selected meta-model with data of the observed network state. An action generation module may be operable to generate one or more recommended action plans for the real time command center.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The present disclosure describes a system, referred to herein as Decision Support System Optimizer (DSSO), and methodologies thereof. The DSSO of the present disclosure in one aspect may provide for an efficient procedure for facilitating real-time command center operations by, on the one hand capturing the complex structure of constraints that are a natural part of such systems, and on the other hand by permitting a determination, in real-time, of the likely impact of one or more actions based on the actual state of the system.

Figure 1:
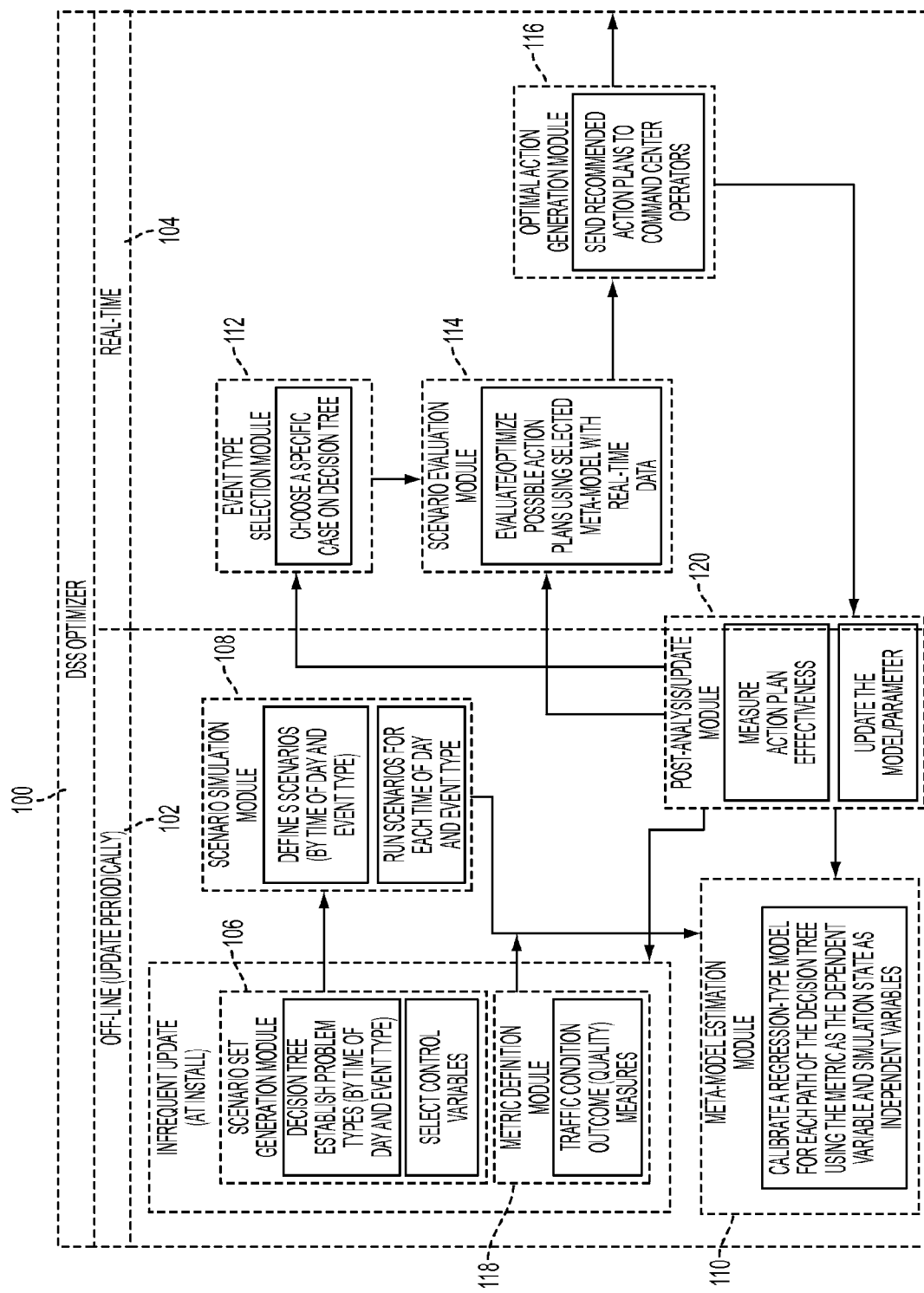
FIG. 1 is an architectural diagram illustrating a system in one embodiment of the present disclosure.

FIG. 1 is an architectural diagram illustrating the DSSO in one embodiment of the present disclosure. The Decision Support System Optimizer 100 in one embodiment may include a decision tree component, a simulator component, and a meta-model component. In addition, in one embodiment, the DSSO includes two phases in which it is used, the off-line phase 102 and the real-time phase 104.

The off-line phase 102 makes use of historical data collected over several days, weeks, or months, for example. In one embodiment, the offline phase 102 may include a decision tree calibrated off-line, a scenario simulation component, and a set of meta-models calibrated offline from the simulations. In one embodiment of the present disclosure, the decision tree has a classification function in which different network states and event types are categorized according to their characteristics.

For instance, a module or functionality (e.g., shown in FIG. 1 as Scenario Set Generation Module) 106 may use a decision tree to establish problem and/or event types, and classify network states into one or more categories. Various attributes or variables that contribute to the states of the network can be selected for use as control variables in the simulation. The classified categories including their control variables can be used as simulation scenarios to be simulated.

The scenario simulation component involves running specialized simulations of the network behavior in the presence of various types of incidents and for various states. The scenario simulation component models typical behavior on the network given historically observed network characteristics and assesses the outcomes of various control strategies in such cases. In one embodiment of the present disclosure, this part of the procedure is run in an off-line phase, and therefore, a large number of such scenarios can be simulated. For instance, a module or functionality 108 (e.g., shown in FIG. 1 as Scenario Simulation Module) simulates a scenario corresponding to a classified category of network states. Based on different types of attributes or variables, a plurality of different network states or scenarios can be simulated. For example, scenarios may be defined by time of day and event type and different scenarios may be run for each time of day and event type.

Another module or functionality (shown in FIG. 1 as Metric Definition Module) 118 may define one or more outcome or quality measures. These measures may be used by the meta-modeling component as described below as one or more outputs to a meta-model.

The meta-modeling component includes the calibration of formulae that link the inputs and outputs of the simulation runs, namely the network state, event characteristics, and control strategy as input, and the outcome or impact as output. These formulae are determined by the meta-modeling component 110 (e.g., shown in FIG. 1 as Meta-Model Estimation Module) directly, for example, in the form of statistical regressions.

A single regression might not adequately represent the very large range of possible input values (network states, control actions possible, events) and output values (outcomes). The decision tree is used in this respect so as to classify that very large range into subsets of the range which are similar unto themselves. Thus, a regression-type model may be calibrated for each subset, e.g., for each path of the decision tree using the define metrics (outcome) as the dependent variable and simulation state (state attributes or variables) as independent variables.

The on-line phase 104 involves again the use of the decision tree, this time in the real-time data, to identify the state and the critical problems of network and to identify their characteristics. When an event occurs or is triggered, an on-line operator may invoke a decision tree to identify critical problems of network and to determine problem types. For instance, an automated software module executing on a processor, (e.g., EventType Selection Module shown at 112) may select a specific case or scenario from the decision tree based on the observed state of the network, i.e., various attributes and variables associated with the observed state.

The decision tree provides selection criteria so that at least one meta-model corresponding to the current (real-time) observed state is chosen. The decision tree can be obtained from the stored data obtained by running the numerous simulations for different states of the network and different incident characteristics. That batch data reflects potential conditions on the network with and without various incidents (accidents, non-recurrent congestions, events, and/or others). One method to obtain the decision tree is by applying a regression tree procedure to the above-described simulation-based data. Such a procedure develops statistical regression models applied to subsets of the full set of data. The subsets are obtained by the procedure itself so that the individual regression models fit best the data. In practice, this type of procedure results in a decision tree in which the categories of the data have similar statistical properties. This approach does not necessarily employ the regression models from such a procedure but keeps the tree that resulted from such a procedure. It is possible to obtain such a tree with like properties at each leaf of the tree without using a regression tree approach by manually constructing different possible trees and selecting that which represents best the data according to some metric of statistical fitness.

Once appropriate one or more meta-models are selected, possible action plans are evaluated and optimized using the meta-models. For instance, an automated software module executing on a processor (e.g., Scenario Evaluation Module shown at 114) may evaluate and/or optimize possible action plans using a selected meta-model with real-time data. For instance, a selected meta-model is run using the real-time data (i.e., the attributes or variables of the observed network state) and various action plans as inputs to the selected meta-model. The output of the selected meta-model is then observed. Note the output of a meta-model was defined as one or more metrics that can measure the quality of the network. In this way, the impact of applying the one or more action plans to an observed network state can be evaluated.

While the simulation-based data is used to calibrate the meta-models offline, the models are evaluated in the on-line phase on observed, real-time provided data. The output of the DSSO can therefore be used to rank various control or action plans based on the outcome of the optimization of the meta-models.

A decision tree is a specification of rules and thresholds at which point each rule applies. See, for example, "http://publib.boulder.ibm.com/infocenter/brdotnet/v7r0m2/index.jsp-?topic=/com.ibm.websphere.ilog.brdotnet.doc/Content/Business_Rules/Documentation/_pubskel/Rules_for_DotNET/ps_RFDN_Global608.html". Typically, the rules depend on many factors so that such decision trees require examining several conditional statements to determine the set of rules that are applicable in each case. In the present disclosure, in one embodiment, the decision tree is used to identify various characteristics of the event, for example, the problem type, and consequently identify the appropriate corresponding meta-model(s).

Figure 2:
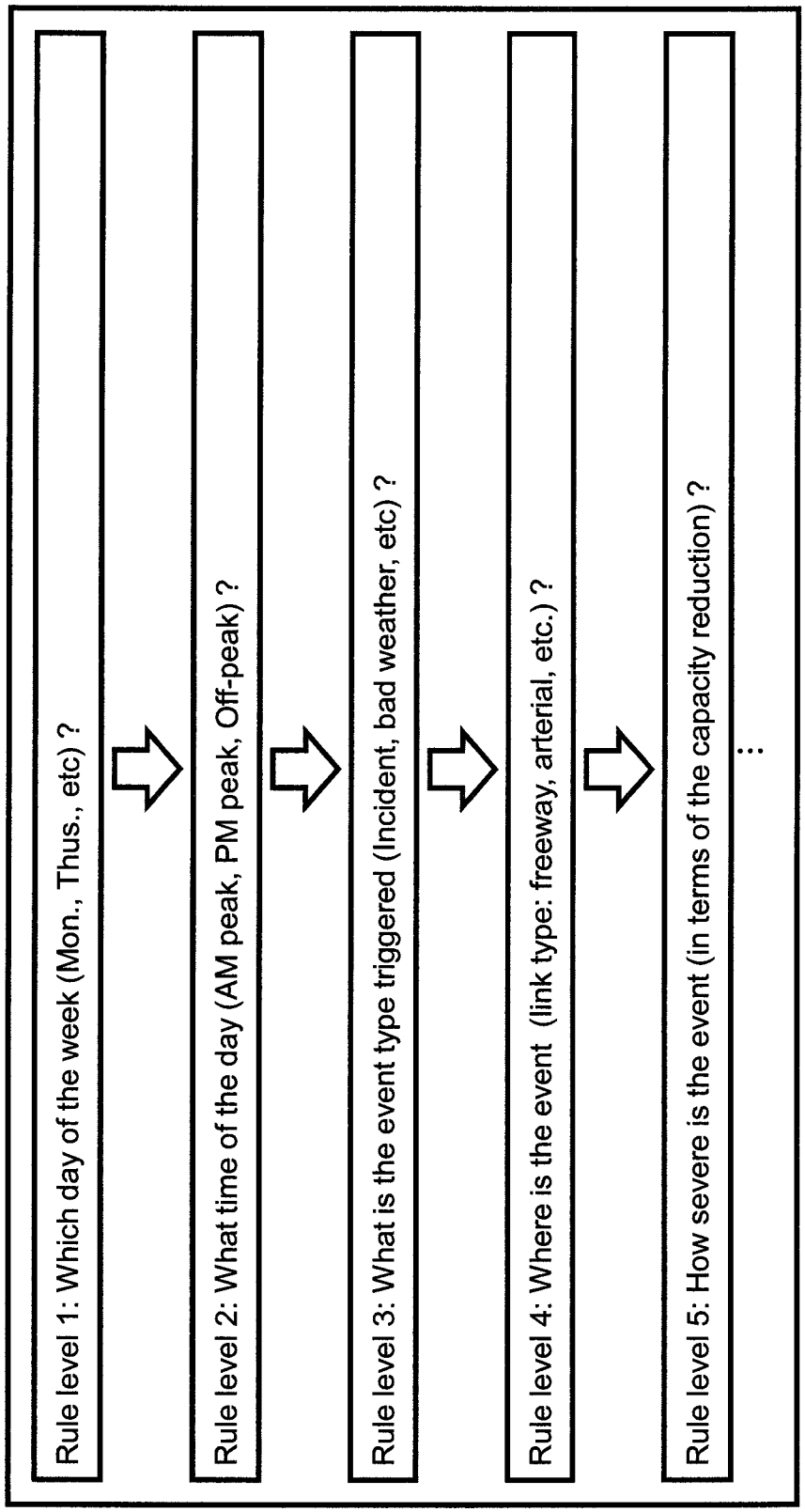
FIG. 2 shows a path of a decision tree for a road traffic network example in one embodiment of the present disclosure.

FIG. 2 shows an example path of a decision tree. It shows a path, or branch, of a decision tree for a road traffic network example. When an event is identified (for example, an incident), the decision tree is used to assess the pertinent characteristics of that event with an objective of enabling the appropriate selection of one or more meta-models. The path of the decision tree leads to a set of characteristics of the event having similar or predictable outcomes. The values at leave level may be categorical, such as "high, medium, or low" or numerical ranges, such as capacity reductions of "0-20%, 20%-40%, 40-60%, 60-70% and greater than 70% reduction". Based on the answers to the questions shown in FIG. 2, different path is taken in the decision tree. The end of the decision tree leads to a selection criteria for selecting a meta-model or a simulation scenario and will correspond to one or more models.

In some cases, the ordering of the rules is important, whereas in other cases, the order is not important, for example, the order can be switched. In the example shown in FIG. 2, the ordering of the rules could have been switched. For instance, the first rule in FIG. 2 categorizes the day of the week, and the second categorizes the time of day. These could have been traversed in the reverse order. The same is true for the other rules in this example. In this example, the use of the rules in the decision tree is to provide a categorization of the event which can be well-represented by one or a known set of meta-models. The events which satisfy all rules along the particular path, as in the example, have like characteristics.

Referring back to FIG. 1, the system and methodology of the present disclosure include a meta-model (for example, calibrated at 110) calibrated in the offline phase from a form of numerical simulation. The simulation itself can take many forms. The simulation (shown at 108) provides the capability to assess "what if" scenarios and predict the likely outcomes, if the state of the system were known. For instance, the capability represented by the simulation component 108 is one in which some definition of the state of the network is provided as well as one or more "events" (incidents, for example) and the simulation program 108 simulates the response on the network to that/those events given the initial state of the network that was provided. The initial state would be the set of values of the various input parameters, such as traffic levels, time of day, day of week, etc.

In addition to simulating the impact of events on various initial states, the simulation program 108 can also simulate the impact of the event when some control action is performed. An example is simulating the closing of certain roads in the direct path of an event represented by a traffic accident. Another example involves opening temporary stockage facilities in a supply chain network if some transportation lines are unavailable to existing stockage facilities.

The outcome provided by the simulation program may depend heavily on the initial state of the system that was provided to the simulator. For this reason, in one embodiment of the present disclosure, the simulation may be run many times, with different definitions of the input state, different events, and different control actions to be imposed.

The set of data from the simulation program runs is then supplied to the offline calibration step of the meta-model.

The meta-model calibration 110 in the offline phase in one embodiment of the present disclosure may rely in turn on the decision tree. For each path of the decision tree, which represents a particular category of network state/event/action, the corresponding simulation data is aggregated. That data is then used to calibrate a regression-type equation or set of equations, to relate the state and event to the outcome.

In one embodiment of the present disclosure, the meta-model calibration 110 may rely on the definition of specific metrics 118 to quantify outcome. Examples of such metrics may be network delay, average speed or time, etc. A suitable metric should be able to capture the quality of the action taken. For instance, on a data network, actions in terms of rerouting or suppressing lines are possible, and a suitable metric to assess the quality of an action is the end-to-end packet delay. More than one metric may be used as well. In a transportation network, average speed and average density may both be used as metrics.

Given one or more metrics to assess quality of an outcome, a regression-type equation may be calibrated for each path on the decision tree. In other words, for a like set of network state and event, a single equation can quantify the expected benefit of particular actions being taken, using the simulation data as input to the calibration of the equation. Each such equation is a meta-model. The inputs of the equation during its calibration are the state variables such as the characteristics of the network and the event and the control, if one was performed, and the output is the value of the metric. The calibration step provides the weights of each input parameter. For example, the calibration step determines the coefficients for the independent variables in a regression-type equation, an example of a meta-model.

In the on-line phase, the calibrated weights can be used and the real-time observed state variables, including event characteristics, input to provide an assessment of the likely outcome. Using different potential actions provides therefore a set of different potential outcomes for that state, and the ones(s) with the best likely outcome would be provided to the command center operators as suggested actions to perform given the real-time situation.

Based on the evaluated action plans, a module or functionality, which we refer to herein as an Optimal Action Generation Module 116 shown in FIG. 1 may send a recommended action plans to a command center operator. This allows for immediate action to be taken if such an action is clear and evident outside the scope of the decision support system, in the case of an emergency situation. In one embodiment of the present disclosure, the action plan should still be provided by the system in addition.

The post-analysis and update module 120 takes into account actual observations from real data including incidents as recorded from a data feed using sensors on the network. The effectiveness of the action plans may be measured using the actual observed data resulting from the implementation of the action plans suggested by the Optimal Action Generation Module 116. The module 120 allows for recalibration of the decision tree and the meta-models at each leaf of the tree, e.g., based on the analysis.

Figure 3:
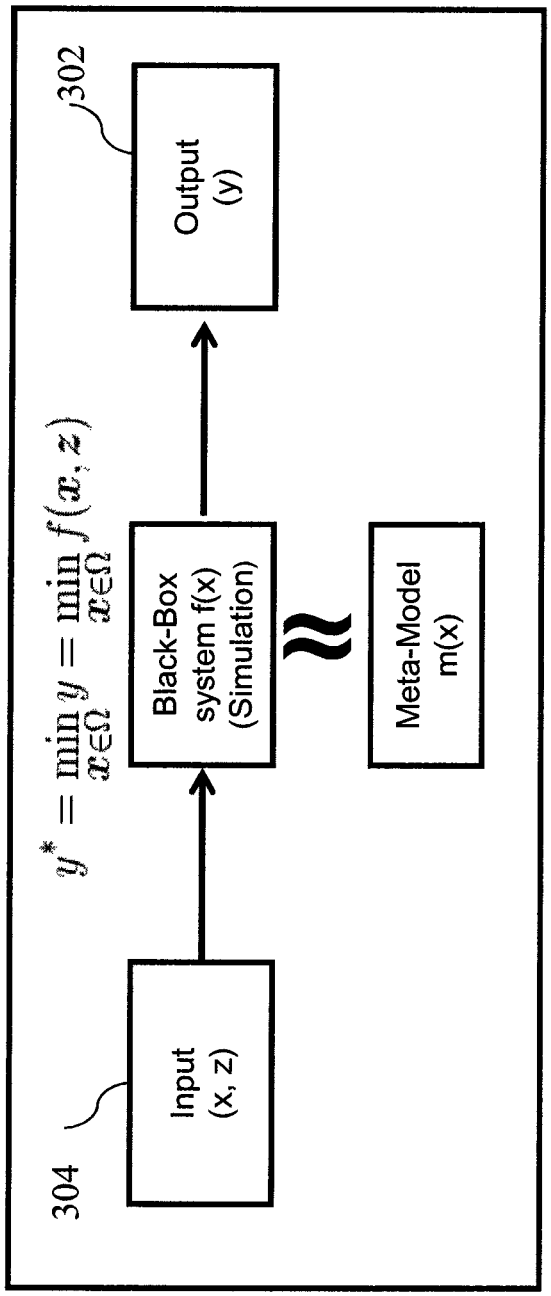
FIG. 3 illustrates a general meta-model which approximates simulation procedure.

FIG. 3 illustrates a general meta-model which approximates simulation procedure. The meta-model models an optimization problem—minimization of certain measures for network effectiveness (y) 302 with network status variables (z) and action plans as decision variables (x) 304. For example, in the traffic domain, total Travel time, total Delay, and average Speed deviation could be relevant y measure of effectiveness (MOE). An example of a control variable (x) could be "20% of lane closure in upstream links until the end of incident". The status variable (z) could contain real-time traffic information such as incident link type (highway), severity (capacity reduction), link speed deviation, and link volume to capacity ratio.

In one embodiment of the present disclosure, given various meta-modeling options, the best model may be chosen based on several criteria. In this step, more training points (scenarios) may be added into meta-models if needed. A nonlinear (possibly mixed integer) optimization algorithm may be developed to estimate the action plan that may be considered optimal from the meta-models.

In one aspect, a meta-model based simulation optimization method in the present disclosure may combine (1) pre-analysis of network dynamics and selection of input combinations, (2) simulation design to specify the scenarios including network condition and input combinations, (3) meta-modeling to analyze the global simulation input/output data that result from the simulation design, (4) validation of meta-models to find the best meta-modeling options, (5) nonlinear (possibly mixed integer) programming to find the optimal scenario (action plan) from the meta models.

Figure 4:
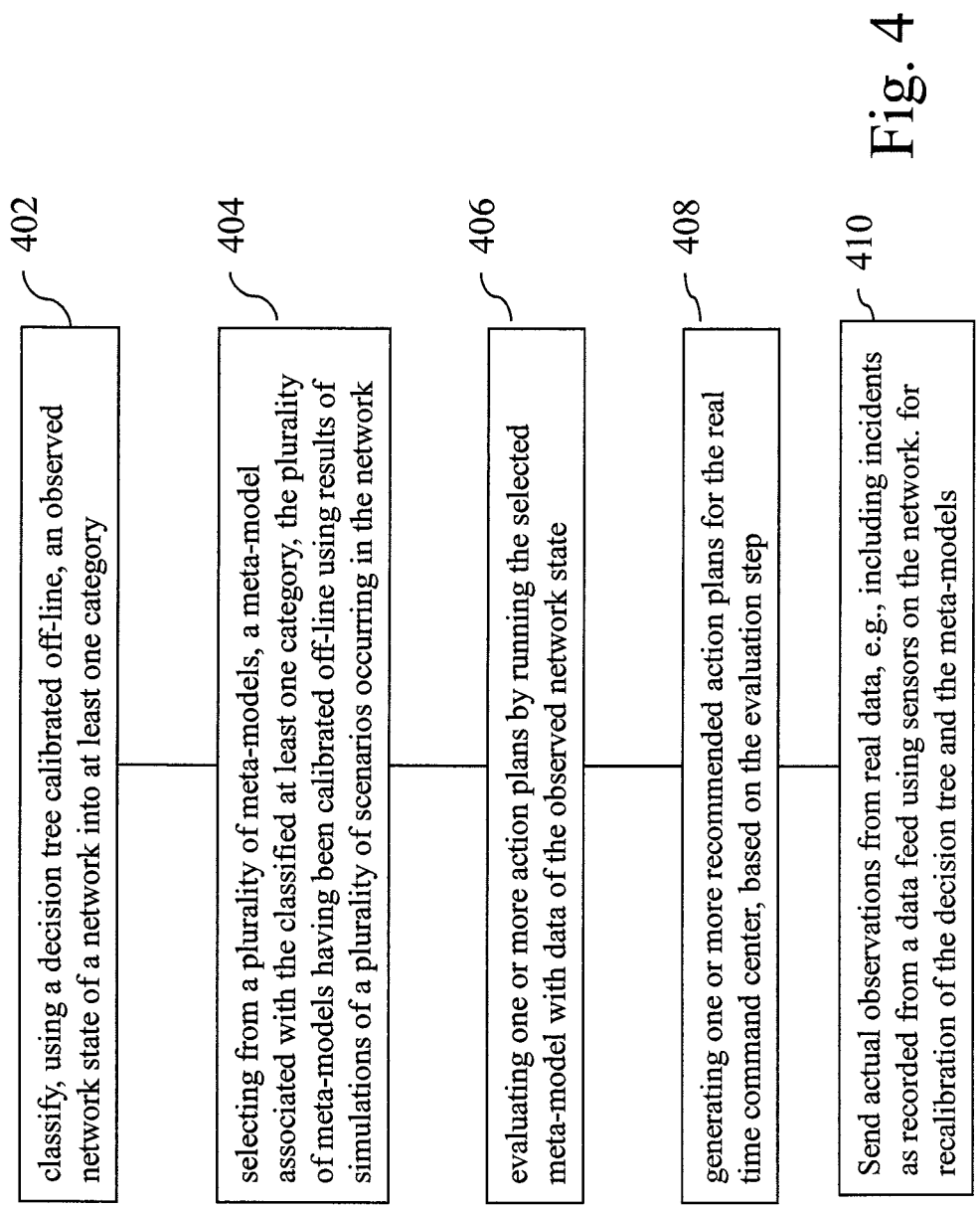
FIG. 4 is a flow diagram showing a method performed in on-line phase in one embodiment of the present disclosure.

FIG. 4 is a flow diagram showing a method performed in on-line phase in one embodiment of the present disclosure. At 402, observed network state of a network is classified into at least one category using a decision tree calibrated off-line. At 404, a meta-model associated with the classified at least one category is selected a plurality of meta-models. The plurality of meta-models includes those calibrated off-line using results of simulations of different scenarios occurring in the network. At 406, one or more action plans are evaluated by running the selected meta-model with data of the observed network state and the one or more action plans as input and observing the metrics of the output. At 408, based on the evaluation step, one or more recommended action plans are generated for the real time command center, based on the evaluation step. At 410, the data resulting from observing the actual real time network's behavior or outcome as a result of applying the one or more recommended action plans may be sent to another module for analysis. In one aspect, the real time resultant data may be stored in persistent memory for analysis off-line, and/or transmitted to another module for analysis.

Figure 5:
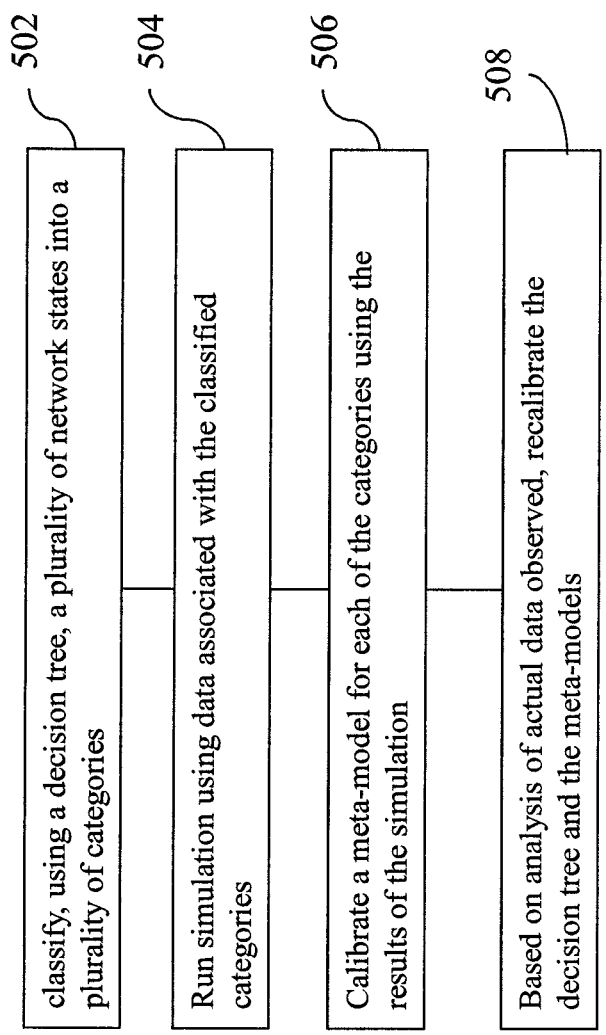
FIG. 5 is a flow diagram showing a method performed in off-line phase in one embodiment of the present disclosure.

FIG. 5 is a flow diagram showing a method performed in off-line phase in one embodiment of the present disclosure. At 502, using a decision tree, a plurality of network states is classified into a plurality of categories. At 504, simulation of network activities or behavior is run using the network state data associated with the classified categories. At 506, a meta-model for each of the categories is calibrated using the results of the simulation. Such calibrated meta-models may be used with real-time actual network state data during the on-line phase to suggest or recommend an action plan for an actual network. At 510, the data resulting from observing the actual network's behavior or outcome as a result of applying one or more recommended action plans are analyzed to measure the effectiveness of the action plans. Using this analysis, the meta-models and the decision trees may be recalibrated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of providing decision support for real time command center, comprising:
   classifying, using a decision tree, an observed network state of a network into at least one category;
   selecting from a plurality of meta-models, a meta-model associated with the classified at least one category, the plurality of meta-models having been calibrated using results of simulations of a plurality of scenarios occurring in the network;
   evaluating one or more action plans by running the selected meta-model with data of the observed network state; and
   generating one or more recommended action plans for the real time command center, based on the evaluation step.

2. The method of claim 1, wherein the network includes transportation network, water network, or energy grid network, or combinations thereof.

3. The method of claim 1, wherein each of the plurality of meta-models are calibrated by using a decision tree to classify historical data into a category, running a simulation using the classified historical data, and calibrating a meta-model according to results of the simulation.

4. The method of claim 1, wherein the observed network state represents a current network state and the steps of classifying, selecting, evaluating, and generating are performed in real-time.

5. The method of claim 1, wherein the meta-model is a regression-type equation.

6. The method of claim 5, wherein the meta-model includes a defined metric representing an outcome as a dependent variable of the meta-model, and a network state associated with a simulated scenario and one or more action plans applied to the network state as independent variables of the meta-model.

7. A decision support system for real time command center, comprising:
   a processor;
   an event-type selection module operable to execute on the processor and further operable to classify an observed state of a network of a network into at least one category using a decision tree;
   a scenario evaluation module operable to select from a plurality of meta-models, a meta-model associated with the classified at least one category, the plurality of meta-models having been calibrated using results of simulations of a plurality of scenarios occurring in the network, the scenario evaluation module further operable to evaluate one or more action plans by running the selected meta-model with data of the observed network state; and
   an action generation module operable to generate one or more recommended action plans for the real time command center.

8. The system of claim 7, further including:
   a simulation module operable to run a plurality of simulation scenarios corresponding respectively to a plurality of categories of states of the network, the plurality of categories classified by using the decision tree; and
   a meta-model estimation module operable to calibrate the plurality of meta-models respectively for the plurality of categories of states of the network simulated.

9. The system of claim 8, further including:
   a scenario set generation module operable to use the decision tree to generate the plurality of simulation scenarios and further operable to select one or more control variables used in the plurality of simulation scenarios, said one or more control variable for use as independent variables in the meta-model.

10. The system of claim 9, further including:
    a metric definition module operable to define a metric for representing an outcome measure, the metric being used as a dependent variable in the meta-model.

11. The system of claim 7, wherein the network includes transportation network, water network, or energy grid network, or combinations thereof.

12. The system of claim 7, wherein the observed network state represents a current network state and the steps of classifying, selecting, evaluating, and generating are performed in real-time.

13. The system of claim 7, wherein the meta-model is a regression-type equation.

14. The system of claim 7, further including an analysis and update module operable to use observed data from the network having applied the recommended one or more action plans to evaluate effectiveness of the recommended one or more actions and further operable to recalibrate one or more of the calibrated meta-models.

15. A computer readable storage medium storing a program of instructions executable by a machine to perform a method of providing decision support for real time command center, comprising:
    classifying, using a decision tree, an observed network state of a network into at least one category;
    selecting from a plurality of meta-models, a meta-model associated with the classified at least one category, the plurality of meta-models having been calibrated using results of simulations of a plurality of scenarios occurring in the network;
    evaluating one or more action plans by running the selected meta-model with data of the observed network state; and
    generating one or more recommended action plans for the real time command center, based on the evaluation step.

16. The computer readable storage medium of claim 14, wherein the network includes transportation network, water network, or energy grid network, or combinations thereof.

17. The computer readable storage medium of claim 15, wherein each of the plurality of meta-models are calibrated by using a decision tree to classify historical data into a category, running a simulation using the classified historical data, and calibrating a meta-model according to results of the simulation.

18. The computer readable storage medium of claim 15, wherein the observed network state represents a current network state and the steps of classifying, selecting, evaluating, and generating are performed in real-time.

19. The computer readable storage medium of claim 15, wherein the meta-model is a regression-type equation.

20. The computer readable storage medium of claim 19, wherein the meta-model includes a defined metric representing an outcome as a dependent variable of the meta-model, and a network state associated with a simulated scenario and one or more action plans applied to the network state as independent variables of the meta-model.

21. A method of providing decision support for real time command center, comprising:
- classifying, using a decision tree, a plurality of network states into a plurality of categories;
- simulating a network using network state data associated with each of the classified categories; and
- calibrating a meta-model for each of the classified categories using results of the simulating.

22. The method of claim 21, further including recalibrating the meta-model using data observed from an actual network that applied one or more action plans recommended as a result of evaluating said one or more action plans from running the meta-model.

* * * * *